Jan. 16, 1951  W. R. HANKES  2,537,996
OPTICAL VIEWER FOR VEHICLE INSTRUMENTS
Filed Jan. 17, 1945  7 Sheets—Sheet 1

Inventor
WILBUR R. HANKES

By Ralph L. Chappell
Attorney

Inventor
WILBUR R. HANKES

Jan. 16, 1951 W. R. HANKES 2,537,996
OPTICAL VIEWER FOR VEHICLE INSTRUMENTS
Filed Jan. 17, 1945 7 Sheets-Sheet 3

Inventor
WILBUR R. HANKES
By Ralph L. Chappell
Attorney

Jan. 16, 1951 W. R. HANKES 2,537,996
OPTICAL VIEWER FOR VEHICLE INSTRUMENTS
Filed Jan. 17, 1945 7 Sheets-Sheet 4

Inventor
WILBUR R. HANKES
By Ralph L Chappell
Attorney

Jan. 16, 1951  W. R. HANKES  2,537,996
OPTICAL VIEWER FOR VEHICLE INSTRUMENTS
Filed Jan. 17, 1945  7 Sheets-Sheet 5

Inventor
WILBUR R. HANKES
By Ralph L Chappell
Attorney

Jan. 16, 1951  W. R. HANKES  2,537,996
OPTICAL VIEWER FOR VEHICLE INSTRUMENTS
Filed Jan. 17, 1945  7 Sheets-Sheet 6

Inventor
WILBUR R. HANKES
By Ralph L Chappell
Attorney

Jan. 16, 1951 W. R. HANKES 2,537,996
OPTICAL VIEWER FOR VEHICLE INSTRUMENTS
Filed Jan. 17, 1945 7 Sheets-Sheet 7

Inventor
WILBUR R. HANKES
By Ralph L. Chappell
Attorney

Patented Jan. 16, 1951

2,537,996

UNITED STATES PATENT OFFICE 2,537,996

OPTICAL VIEWER FOR VEHICLE INSTRUMENTS

Wilbur R. Hankes, United States Navy

Application January 17, 1945, Serial No. 573,231

7 Claims. (Cl. 88—24)

(Granted under the act of March 3, 1883, as amended April 30, 1928; 370 O. G. 757)

This invention relates to instruments for aircraft or other vehicles, and has general application to vehicle instrument installations including means for superimposing the images of one or more instruments on the external field of vision of the vehicle.

More specifically, the invention concerns instrumentalities whereby the information available on vehicular instruments is optically projected to a transparent viewing screen on the normal forward field of vision from the vehicle. It is the purpose of such an installation to provide means whereby the vehicle operator may concentrate his attention on the external scene forward of the vehicle at all times, and yet keep himself informed as to the readings of the flight instruments.

The aim of providing a device of this character is to reduce the possibility of accidents that might be caused by any installation in which it is necessary for the pilot to repeatedly shift his attention from the instrument panel to the external scene and thence back again to the instrument panel. In this connection it may be pointed out that although a pilot of an aircraft can maintain his craft in proper flight attitude by observation of the instrument panel alone, yet, in conventional installations, it is sometimes necessary to continuously shift attention from the instrument panel to the forward field of vision of the aircraft and back again in order to properly control the plane. Such a situation may arise in several ways, one of the most common being the situation in which a pilot is flying on instruments and is descending and attempting to make a landing. As the plane descends through the overcast, it is necessary for the pilot to maintain a vigilant watch on the instrument indications in order to maintain proper flying speed, flight attitude, and to keep himself informed as to his absolute altitude above the ground. It is equally necessary, however, that the pilot closely observe the field of vision ahead of the aircraft, not only to avoid the possibility of collision with towers, trees or other unexpected obstacles, but also to sight the runway as soon as it is in visible range so that he may manipulate the controls of the airplane in time to effect a smooth landing.

The difficulties inherent in watching both the external field of vision ahead of the aircraft and the instrument panel are believed to be self-apparent and are well recognized in aviation circles; in fact, in large planes having both a pilot and co-pilot, it is common procedure for the pilot to scan the field of vision ahead of the plane as the co-pilot watches the instrument panel and flys the plane in for the landing approach. The instant the pilot sights the runway he gives a prearranged signal to the co-pilot and takes over the manipulation of the plane.

So far as it is known, however, no means has heretofore existed whereby an aircraft piloted by only one man can safely effect a transition from instrument flight to contact flight under conditions of low altitude and poor visibility. That is, it appears impossible for the pilot to concentrate on visual observation without neglecting his flight instruments or vice versa. The problem facing the pilot is further complicated by the fact that the transition between instrument flight and contact flight must be accomplished almost instantly. The necessity of this will be readily apparent when it is considered that modern aircraft travel at extremely high speeds and that, when a plane is descending, a few feet of clear air below an overcast may provide a very short time interval for control manipulation.

So far as is known to this applicant, prior devices contemplating the projection of instrument information onto the windshield of a vehicle have proceeded on the theory that an instrument image projected to a transparent screen in the line of vision of the pilot could be observed simultaneously with the attention of a visual search ahead of the craft. It is submitted, however, that the instrumentalities described and claimed in the present specification accomplish a much more complete solution to the problems heretofore mentioned than any of the prior devices heretofore developed. The theoretical reasons behind this are multiple but a few of the most important may be mentioned as follows:

First, although instrument images of two or more instruments be superimposed on each other, they cannot be regarded as being read with respect to themselves only, and any optical system having no means to equalize the length of the optical path between the observer's eye and the actual instrument will fall short of accomplishing the desired result. That is, if two separate instruments are each viewed through an optical path of unequal length, the image of one instrument will appear closer to the eye than the image of the other. Thus, although both images are in the line of vision, the optical focus of the eye required to clearly see one will differ from the focus of the eye necessary to clearly see the other, and satisfactory simultaneous observation of both is impracticable.

Second, the present disclosure proceeds on the theory that the mere equalization of the optical paths between the observer's eye and two or more flight instruments also falls short of accomplishing the desired results, since it is of first importance that the instrument images be of such nature that the pilot may see them clearly while concentrating on visual search of the field of view of the airplane. Since the rate of speed of modern aircraft is very high, the field of view that the pilot will be most concerned with will be many hundreds of yards ahead of the plane. This means that to effectively observe objects in the flight path his eyes must be focused to almost an infinite distance.

It is a well known fact that the human eye is capable of clear vision only when it is focused to the approximate distance of the object being observed. Moreover, it requires a definite interval of time for an individual to perform the physical reaction necessary to change the focus of his eye from a short distance to infinity and for the mind to interpret what the eye is then seeing. Conversly, it takes a definite period of time to retrace this step when changing the eye focus from infinity to a shorter distance. Thus, even though the images of the instruments are superimposed on the line of sight of the pilot, these images will normally be at relatively short focus, while the visual scene with which the pilot is concerned will be at almost infinite focus. The result is that clear vision of both cannot be obtained at the same time, and that although the instrument images are in the same line of sight as the exterior scene they may only be observed by repeatedly changing the focus of the eye from a short to an infinite distance. This phenomenon may be demonstrated by spreading the fingers of one hand and placing the hand a few inches in front of the eye. It will be seen that if the observer's attention is constantly concentrated on the distant object the hand will appear blurred and indistinct. Similarly, if the attention is concentrated on the hand, distant background objects will become indistinct and tend to lose their form and definition.

The present invention proceeds on the theory the lapse of any time interval in reaching correct focus to observe either the instruments or the external scene may well result in a fatal accident and that the optimum results can be expected only if the instrument images and external scene are simultaneously visible without change of focus of the pilot's eyes.

The third consideration is that the transparent screen in the field of vision of the pilot should be so designed as to transmit a maximum amount of light from the exterior field of vision. Obviously, many observations must be made in conditions of insufficient light and it is regarded as essential to the success of the present that light reaching the cockpit be visible to the pilot with as little loss as possible.

The prime object of the present invention is to provide means for projecting vehicle instrument information to a transparent screen in the forward field of vision from the vehicle, so that all instrument indications may be clearly seen without detracting from clarity of observation of the exterior field of vision.

To this end, an optical arrangement is provided which includes means to equalize the optical distances from the eye to the several instrument images, together with means to combine the several images on a reflecting surface out of the line of vision and to thereafter transmit the several combined images to a single transparent viewing screen, and means to collimate all of the instrument images.

Figure 17:
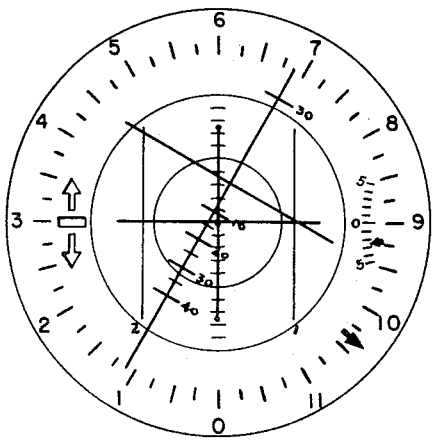

Figures 11, 12, 13, 14, 15 and 16 are illustrations of typical dial indications associated with a directional gyro, artificial horizon, radio altimeter, rate of climb indicator, air speed indicator and ring sight, respectively, and Figure 17 is a face view of the transparent screen used in this modification of the invention illustrating the appearance of all of the aforementioned instrument indications, when combined according to the teachings of this disclosure.

The present application discloses two alternative structures, the first of which being particularly adapted to installation in existing types of aircraft wherein it is desired to utilize the conventional panel instruments and project their images onto a screen in the forward field of vision of the plane. The modification illustrated in Figures 8 to 17 is designed to be built into the structure of an airplane behind the instrument panel.

The device shown in Figures 1 to 4 inclusive includes an exterior casing 10 having a lower opening 11 of a convenient size to fit over the face of the gyro horizon 12 on the instrument panel of the plane. The mirror 13 is provided near the opening 11 so that an image of the face marking 14 will be projected along the broken line 15 illustrated in Figure 2 and will be reflected from the mirror 13 through the negative corrective lens 16 and transparent partial reflector 17. After passing through the reflector the image will be projected through the magnifying lens 18 and reflected from the transparent reflecting screen 19 to the line of vision of the pilot. The line of vision of the pilot will extend along the broken line 21 (Figures 1 and 2) so that as the pilot views the partial reflector 19 it will function as a transparent viewing screen, enabling him to observe the images of the instruments and at the same time see forwardly along the line 21a to observe objects in the forward field of vision ahead of the plane.

The housing 10 includes a side extension 25 having a forward window 26 to fit over the directional gyro 27 on the instrument panel so that an image of the gyro markings 28 will be projected to the mirror 29 and reflected to the transparent partial reflector 17 and thence upwardly through the lens 18 to the transparent reflecting screen 19. It is contemplated, of course, that sources of illumination be provided for both of the instruments 12 and 27, but since these sources of illumination may be either external or internal, they are not shown in this disclosure. It is to be understood, however, that each instrument includes an illuminated face; preferably of variable light intensity so that it may be adjusted to suit the conditions of light and visibility existing outside of the aircraft. It is also contemplated that a colored filter may be introduced so that the light reaching the pilot's eye from the instruments will have no effect upon his night color adaptation.

It has been heretofore stated that the present invention contemplates means to equalize the length of the optical path from the observer's eye to each of the several instruments. Thus in case the instruments are not positioned on the instrument panel so that the optical paths are equal in length, the correcting lens 16 is used to alter the apparent distance of one instrument so that they will both appear in the same plane.

The invention also contemplates the focusing of each of the individual instrment indications so that they will correspond in photo-depth with objects viewed forwardly of the plane. In the case of an aircraft traveling at a high speed, the normal viewing distance approaches infinity and for this reason the lens 18 is provided so that both of the instruments images will be collimated and will appear at infinite focus.

In the form of the invention shown in Figures 8 to 17 inclusive, a transparent reflecting screen 31 is positioned above the cowling of the plane and in the pilot's line of sight so that instrument information may be projected upwardly through the opening 32 from instruments or instrument repeating devices located below the cowling 33. In the plane illustrated, the usual panel instruments are carried on the instrument panel 34, but certain of the instruments will be provided with repeaters forward of the panel and the repeater images are projected to the pilot's eye through the reflecting screen 31. It should be understood, of course, that the reflecting screen may be constructed as a part of the vehicle windshield if desired. However, it is unnecessary to use the windshield itself as a reflecting surface and in some instances it is deemed advisable to use a viewing screen separate from the windshield. The transparent reflecting screen 31 has a plurality of lenses and reflectors associated with it so that the images of a number of repeater instrument dials may be combined and simultaneously viewed through the reflector 31, although the pilot can still look through the reflector 31 and observe objects ahead of the plane.

Figure 1:
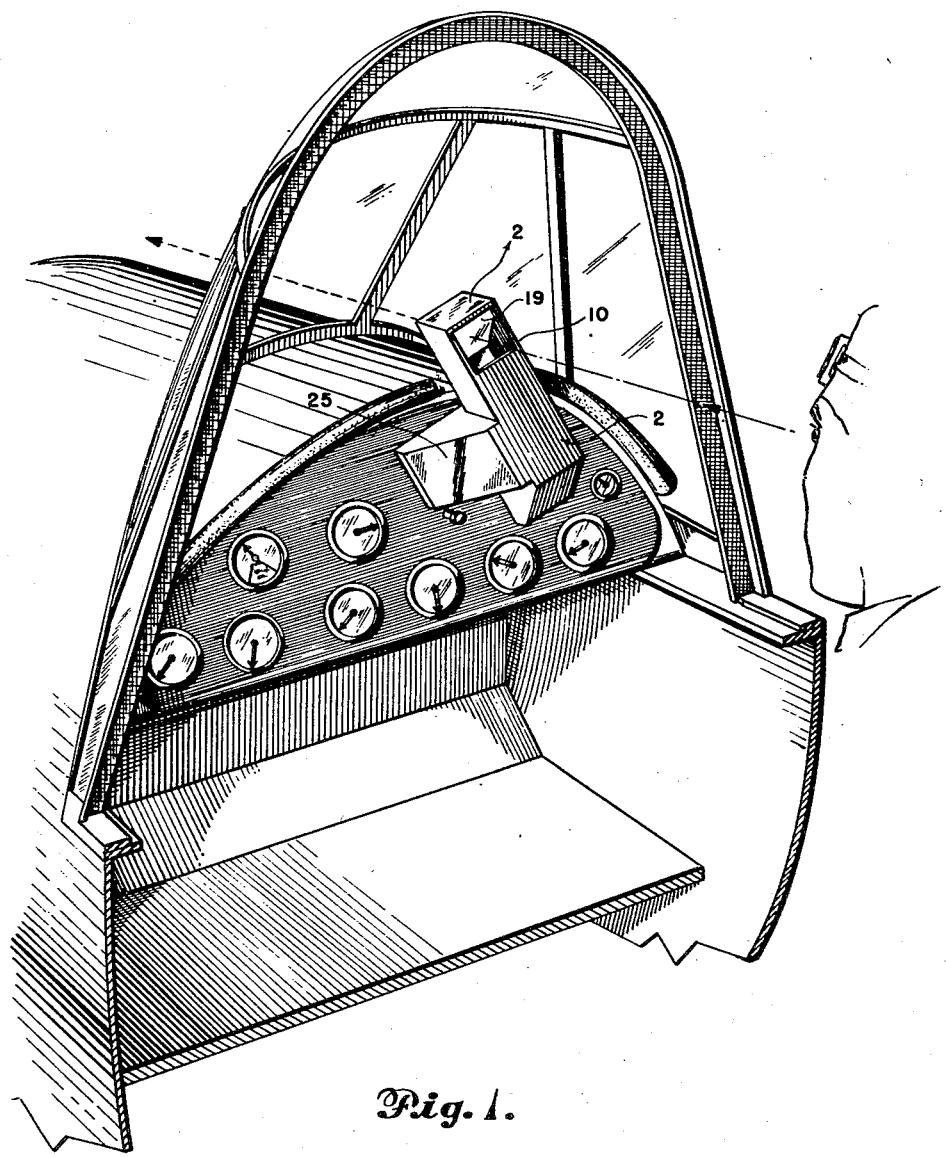
Figure 1 is a perspective view of one form of the invention illustrated in position on the instrument panel of an airplane.
Figure 3:
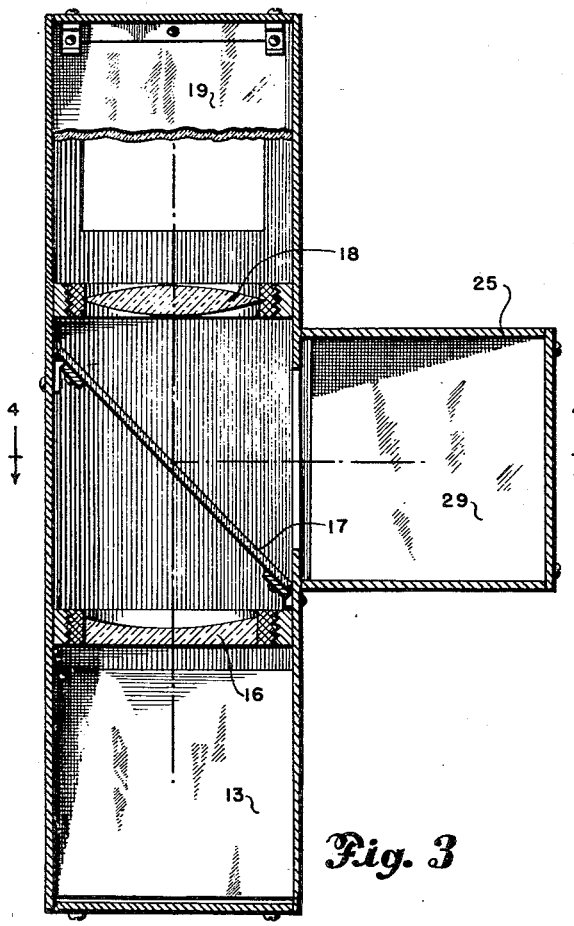
Figure 3 is a section view taken substantially on the plane of the line 3—3 of Figure 2.
Figure 2:
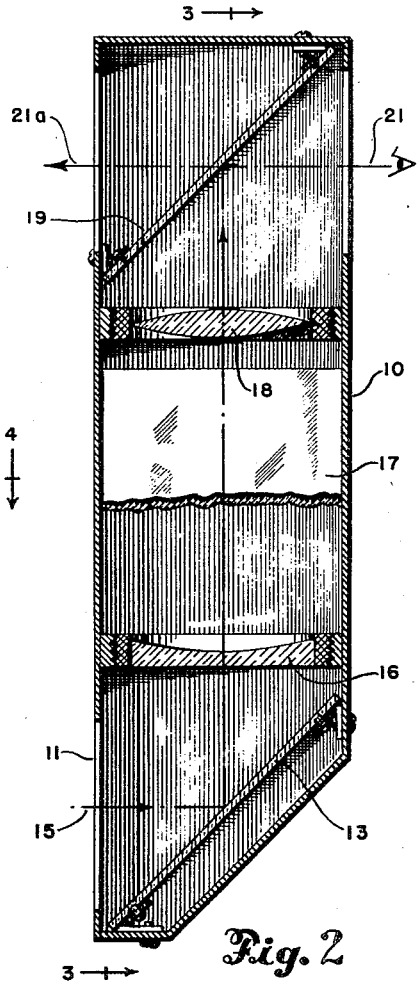
Figure 2 is a central sectional view taken substantially on the plane of the line 2—2 of Figure 1.
Figure 4:
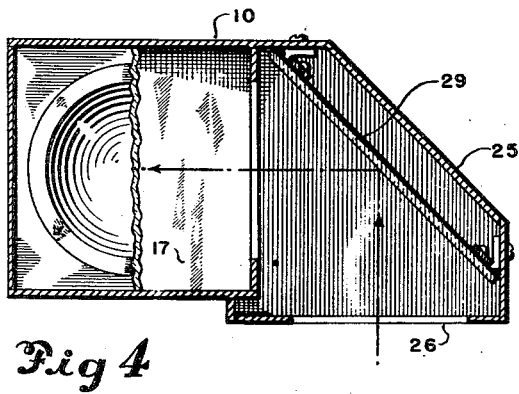
Figure 4 is a sectional view taken substantially on the plane of the line 4—4 in Figure 3.
Figure 6:
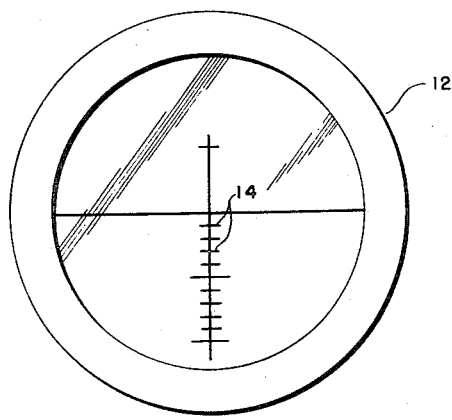
Figure 6 is a face view of the artificial horizon.
Figure 5:
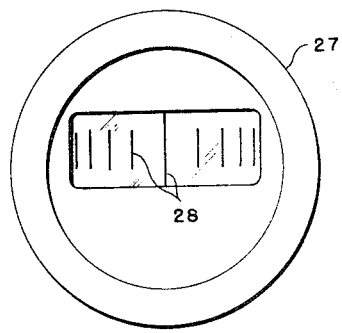
Figure 5 is a face view of the directional gyro of an airplane.
Figure 7:
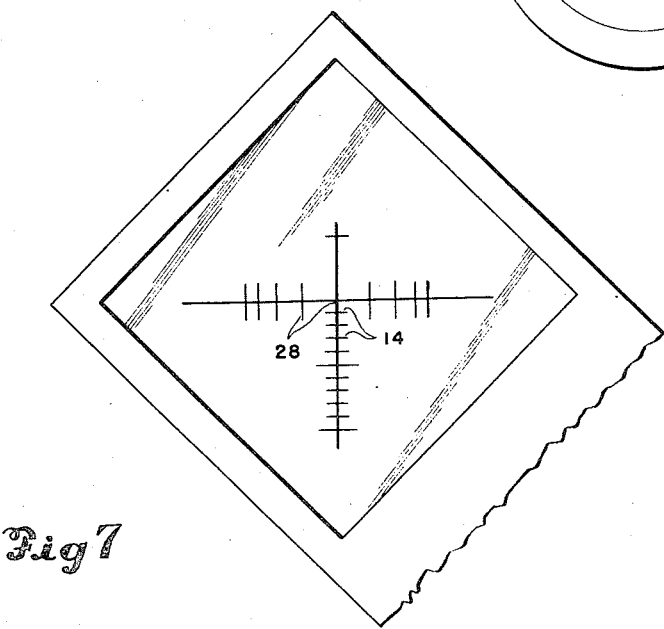
Figure 7 is a fragmental illustration of the device shown in Figures 1 to 4 inclusive, illustrating the appearance of the directional gyro and artificial horizon indications as viewed through the viewing screen.
Figure 8:
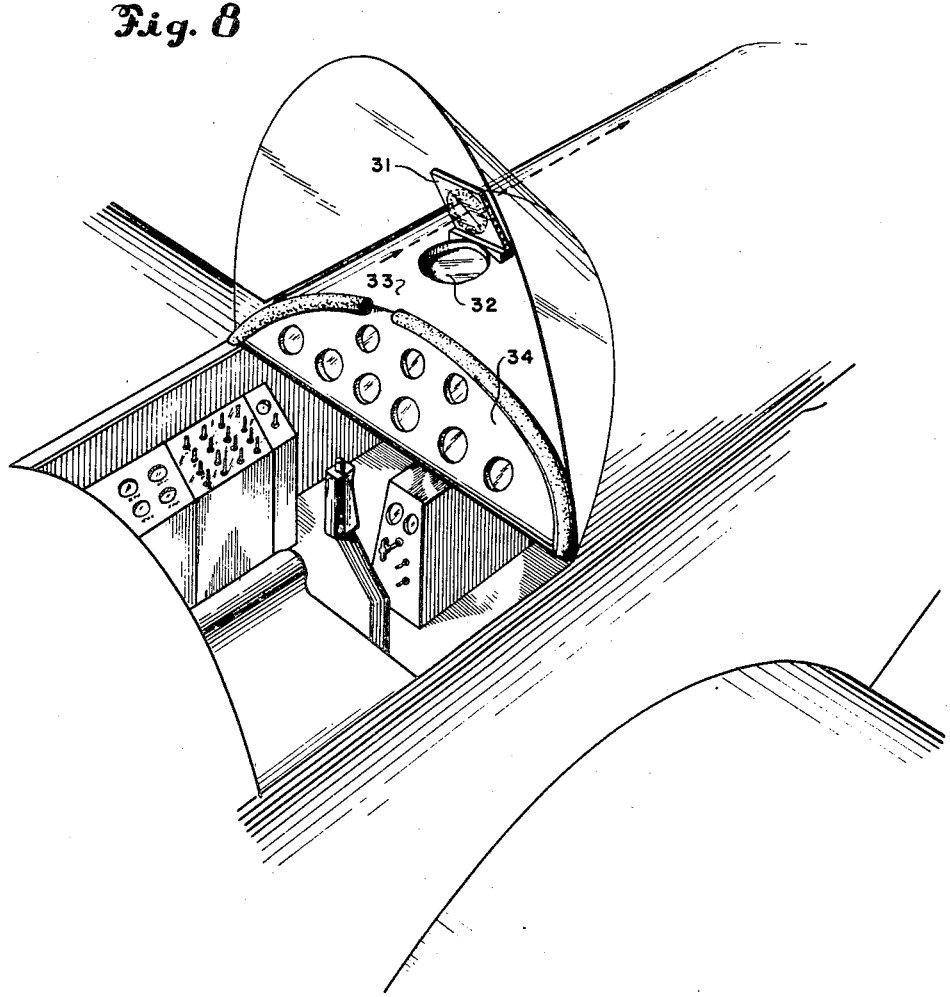
Figure 8 is a perspective view of an airplane cockpit including a modified form of the invention.
Figure 9:
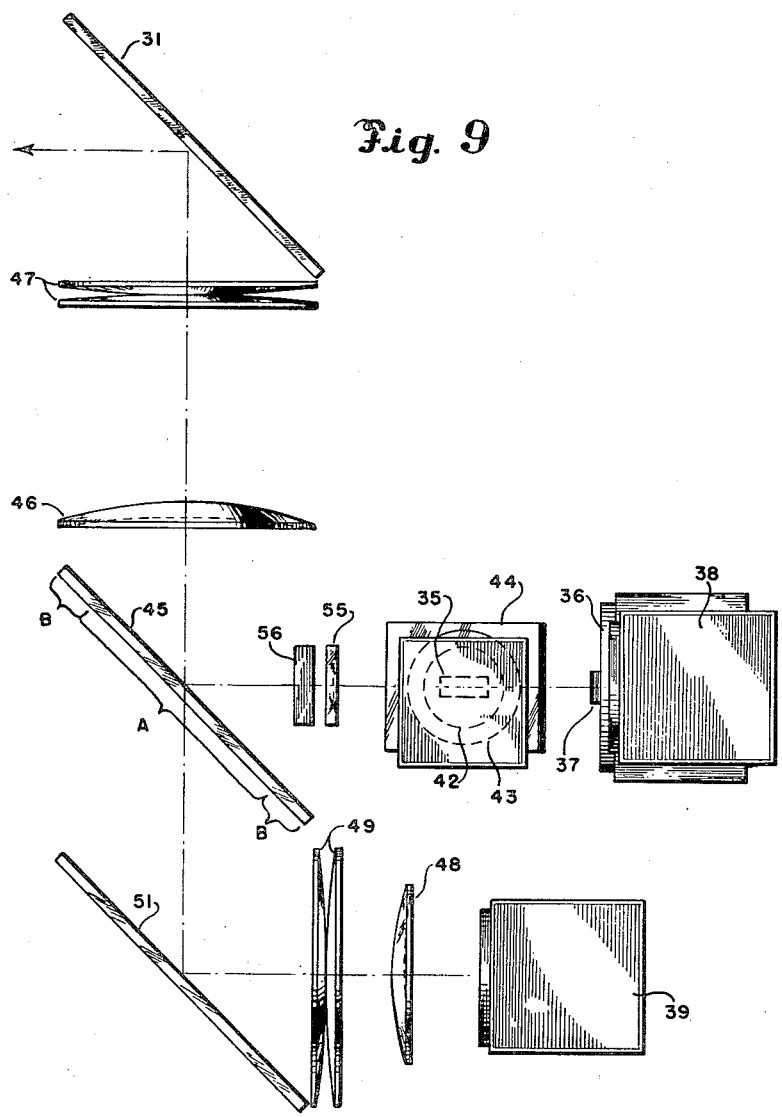
Figure 9 is a diagrammatic illustration of the form of the invention shown in Figure 8 as the several parts appear in vertical central section.
Figure 10:
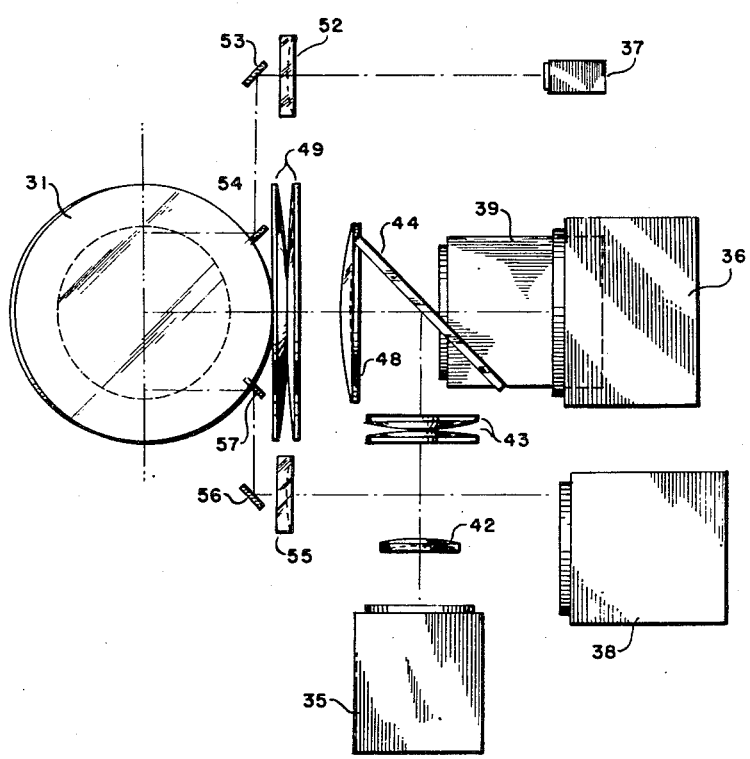
Figure 10 is a plan view of Figure 9.
Figure 11:
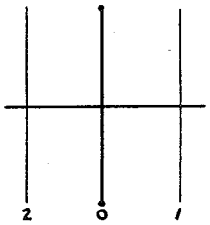
Figure 12:
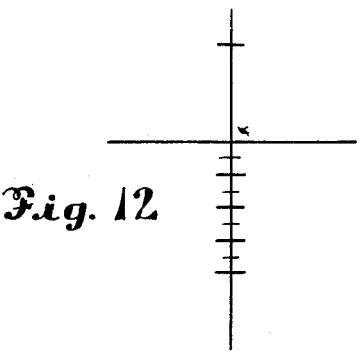
Figure 13:
Figure 14:
Figure 16:
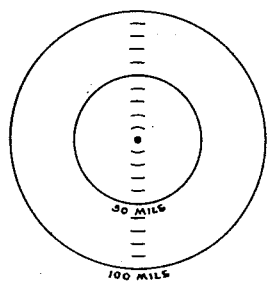
Figure 15:
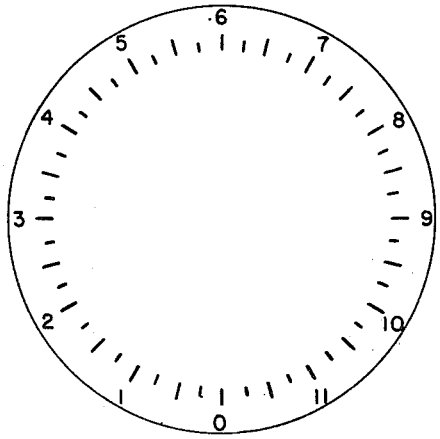

The repeater instruments diagrammatically illustrated in Figures 9 and 10 include a directional gyro 35 having face markings such as illustrated in Figure 11, a gyro horizon 36 having face markings such as shown in Figure 12, radio altimeter lights 37 as illustrated in Figure 13, a rate of climb indicator 38 including a dial marking as shown in Figure 14 and an air speed indicator 39 including a speed dial as shown in Figure 15. In additiion, one of these dials may be provided with an illuminated ring sight indication, such as the sight 41 illustrated in Figure 16. The ring sight image may be superimposed on one of the images heretofore mentioned or may be separately etched on one of the reflecting screens.

Referring now to Figures 9 and 10, it will be seen that the image from the directional gyro 35 will be projected through the lens 42 and condensing lenses 43 to the transparent reflector 44 and thence to the reflecting mirror 45 where it will be reflecting upwardly through the lens 46 and condensing lenses 47 to the transparent viewing screen 31. The face image of the altitude gyro 36 will be projected directly through the transparent mirror 44 to the reflector 45, where it will be superimposed on the image of the directional gyro 35. The combined images of the directional gyro 35 and the attitude gyro 36 will be reflected from the reflector 45 upwardly through the lenses 46 and 47 to the transparent screen 31. If desired, the central area of the reflector 45 (that is, the portion indicated at "A") may be fully silvered to reflect these images without loss of light intensity. The marginal edges of the reflector (indicated at "B") are clear, however, so that the reflector will be transparent around its outer margin to permit the circular image of the air speed indicator dial to be combined with the gyro images heretofore described.

The face image of the air speed indicator 39 is projected through the lens 48 and condensing lenses 49 and is reflected upwardly from the mirror 51. Since the face image of the air speed indicator is circular (see Figure 15), the image will pass through the clear edge surface B of the reflector 45, so that when viewed in the screen 31 it will appear to surround the images of the attitude and direction gyros in a manner illustrated in Figure 17. If desired, other images may also be projected onto the screen 31. For example, the image of the indicating lights of a radio altimeter 37 may be projected through a corrective lens 52 and through a pair of small mirrors 53 and 54 to the central reflecting surface A of the reflector 45. Similarly, the image of the rate of climb indicator 38 will be projected through the corrective lens 55 and pair of mirrors 56 and 57 to the upper side of the reflector 45. Both of these images, of course, will be reflected from the central area of the reflector 45 through the lenses 46 and 47 to the transparent reflecting screen 31.

From the foregoing, it will be apparent that all of the information available on the several instruments indicated will be combined on the reflector 45 and will then be transmitted to the reflecting screen 31, so that it will be available in the direct line of vision from the pilot's eye to objects lying ahead of the plane, and will appear as a single image superimposed on the external scene ahead of the plane.

The appearance of the combined instruments images will vary according to the individual instrument readings, but a typical illustration is indicated in Figure 17, where it will be seen that the transparent reflecting screen in the pilot's line of vision includes a visual indication of the rate of climb, radio altimeter indication, directional gyro, altitude gyro and air speed, as well as an indication of a ring sight. Further, since each of these images is collimated, all of the image indications will appear as superimposed on objects in the forward field of vision from the plane so that the pilot may concentrate his attention on objects in the flight path of the aircraft and yet maintain his awareness of the readings of all of the essential flight instruments.

The present application discloses two structural modifications, both embodying the inventive thought to which this disclosure is directed, and while these two modifications are believed to be typical and well adapted to illustration of the inventive principles, incorporated therein, it is recognized that various other alterations and modifications may be indulged in without departing from the underlying inventive thought, and it is accordingly requested that the scope of the patent be regarded as limited only by the terms of the following claims.

The invention described herein, if patented, may be used by or for the Government of the United States for governmental purposes without the payment to me of any royalty thereon.

Having thus described the invention, I claim:

1. The combination of a vehicle, a single transparent viewing screen positioned in the external field of vision of said vehicle so that the vehicle operator may see through the screen to observe external objects in the path of motion of the vehicle, together with an instrument panel having a plurality of instruments to give information of the operating conditions of said vehicle; repeater instruments for a plurality of the above instruments, said repeater instruments being located forwardly of the instrument panel and below the aforementioned transparent viewing screen; optical means separate from the viewing screen to combine images of at least two of the repeater instruments, said means consisting of a transparent partial reflector: optical means separate from the viewing screen to combine the above-mentioned images with an image of a third instrument, said means including a mirror having transparent portions; means consisting of lenses between the said mirror and the repeater instruments for equalizing the optical distances from said mirror to the several instruments, and means including a lens between the said mirror and the aforementioned viewing screen to collimate all of the images.

2. The combination of a vehicle, a single transparent viewing screen positioned in the external field of vision of said vehicle so that the vehicle operator may see through the screen to observe external objects in the path of motion of the vehicle, together with a plurality of instruments to give information of the operating conditions of said vehicle, said instruments being located forwardly of the vehicle operator's station and below the aforementioned transparent viewing screen; optical means separate from the viewing screen to combine images of at least two of the instruments, said means consisting of a transparent partial reflector: optical means separate from the viewing screen to combine the abovementioned images with an image of a third instrument, said means including a second reflector; means consisting of lenses between the said second reflector and the instruments for equalizing the optical distances from said second reflector to the several instruments, and means including a lens between the said second reflector and the aforementioned viewing screen to collimate all of the images.

3. The combination of a vehicle, a single transparent viewing screen positioned in the external field of vision of said vehicle so that the vehicle operator may see through the screen to observe external objects in the path of motion of the vehicle, together with a plurality of instruments to give information of the operating conditions of said vehicle, optical means separate from the viewing screen to combine images of at least two of the instruments, said means consisting of a transparent partial reflector: optical means separate from the viewing screen to combine the above-mentioned images with an image of a third instrument, and means to collimate all of the images.

4. The combination, with a single transparent viewing screen, of a plurality of instruments; an illuminated dial for each of said instruments; optical means separate from the viewing screen to combine the images of at least two of the instruments, a second optical means separate from the viewing screen to combine the abovementioned images with the image of a third instrument, one of said means including a transparent partial reflector; together with means for equalizing the optical distances from viewing screen to the several instruments.

5. The combination of a vehicle, a single transparent viewing screen positioned in the external field of vision of said vehicle so that the vehicle operator may see through the screen to observe external objects in the path of motion of the vehicle, together with a plurality of instruments to give information of the operating conditions of said vehicle, said instruments being located forwardly of the vehicle operator's station and below the aforementioned transparent viewing screen; an illuminated dial for each of said instruments, optical means for projecting an image of each of the instrument dials in superimposed relationship on the single viewing screen, together with a lens for equalizing the optical distances from said single screen to the plurality of dials, and a lens to collimate all of the images.

6. The combination of a vehicle, a single transparent viewing screen positioned in the external field of vision of said vehicle so that the vehicle operator may see through the screen to observe external objects in the path of motion of the vehicle, together with a plurality of instruments to give information of the operating conditions of said vehicle, an illuminated dial for each of said instruments, optical means for projecting an image of each of the instruments dials in superimposed relationship on the single viewing screen, together with means for equalizing the optical distances from said single screen to the plurality of dials.

7. The combination of a vehicle, a single transparent viewing screen positioned in the external field of vision of said vehicle so that the vehicle operator may see through the screen to observe external objects in the path of motion of the vehicle, together with a plurality of instruments to give information of the operating conditions of said vehicle, said instruments being located forwardly of the vehicle operator's station and below the aforementioned transparent viewing screen; an illuminated dial for each of said instruments, optical means for projecting an image of each of the instrument dials in superimposed relationship on the single viewing screen, together with means for equalizing the optical distances from said single screen to the plurality of dials.

WILBUR R. HANKES.

(References on following page)

REFERENCES CITED

The following references are of record in the file of this patent:

UNITED STATES PATENTS

| Number | Name | Date |
|---|---|---|
| 1,610,532 | Russell et al. | Dec. 14, 1926 |
| 1,821,626 | Fleischer | Sept. 1, 1931 |
| 2,019,234 | Nistri | Oct. 29, 1935 |
| 2,125,225 | Gourdou | July 26, 1938 |
| 2,153,718 | Kitroser | Apr. 11, 1939 |
| 2,160,202 | Fieux | May 30, 1939 |
| 2,178,637 | Link | Nov. 7, 1939 |
| 2,190,569 | Maggill | Feb. 13, 1940 |
| 2,264,044 | Lee | Nov. 25, 1941 |
| 2,307,202 | Eddy | Jan. 5, 1943 |
| 2,313,204 | Morelle | Mar. 9, 1943 |
| 2,358,316 | Chwalow | Sept. 19, 1944 |
| 2,360,768 | French | Oct. 17, 1944 |
| 2,382,631 | Harasta | Aug. 14, 1945 |